US008104597B2

(12) United States Patent
Hackl et al.

(10) Patent No.: US 8,104,597 B2
(45) Date of Patent: Jan. 31, 2012

(54) TRANSMISSION SYNCHRONIZING SYSTEM, IN PARTICULAR, IN THE FORM OF A SERVO SYNCHRONIZING SYSTEM

(75) Inventors: Thomas Hackl, Sattledt (AT); Martin Berger, Stuttgart (DE); Klaus Kalmbach, Mossingen (DE); Janina Steinz, Biebesheim (DE)

(73) Assignee: hofer-pdc GmbH, Stuttgart (DE)

( * ) Notice: Subject to any disclaimer, the term of this patent is extended or adjusted under 35 U.S.C. 154(b) by 642 days.

(21) Appl. No.: 11/901,841

(22) Filed: Sep. 18, 2007

(65) Prior Publication Data

US 2008/0066568 A1 Mar. 20, 2008

(30) Foreign Application Priority Data

Sep. 18, 2006 (DE) .......................... 10 2006 044 352

(51) Int. Cl.
*F16D 23/06* (2006.01)
(52) U.S. Cl. .................. 192/53.31; 74/339; 192/53.341; 192/53.342
(58) Field of Classification Search ............... 192/53.31, 192/53.341, 53.342
See application file for complete search history.

(56) References Cited

U.S. PATENT DOCUMENTS

| | | | |
|---|---|---|---|
| 3,548,983 A | 12/1970 | Kazuyoshi | |
| 4,573,371 A | 3/1986 | Akutagawa | |
| 4,584,892 A * | 4/1986 | Hiraiwa et al. | ................. 74/339 |
| 4,625,844 A * | 12/1986 | Ikemoto et al. | ............. 192/53.34 |
| 4,674,614 A | 6/1987 | Ikemoto et al. | |
| 5,887,688 A | 3/1999 | Ploetz et al. | |
| 5,924,535 A | 7/1999 | Reynolds et al. | |
| 2005/0061095 A1 | 3/2005 | Yoshino et al. | |
| 2007/0029155 A1 | 2/2007 | Hiraiwa | |

FOREIGN PATENT DOCUMENTS

| | | |
|---|---|---|
| DE | 1 924 724 C | 11/1969 |
| DE | 1 650 814 A | 9/1970 |
| DE | 24 31 324 | 8/1975 |
| DE | 9 408 943 U1 | 7/1994 |
| DE | 195 80 558 C1 | 1/1998 |
| DE | 698 02 154 T2 | 2/1999 |
| DE | 200 22 345 U1 | 8/2001 |
| DE | 10 2004 036 507 B3 | 10/2005 |
| EP | 0 090 084 A2 | 10/1983 |

(Continued)

OTHER PUBLICATIONS

Hackl et al., Reduzierung von Schaltkraeften mit alternativen Synchronisierungskonzepten, VDI Berichte, Duesseldorf, Germany, 2006, pp. 171-192.

(Continued)

*Primary Examiner* — Rodney Bonck
(74) *Attorney, Agent, or Firm* — TraskBritt

(57) ABSTRACT

The invention relates to a synchronization piece which, as part of a servo synchronization system comprising a sliding sleeve, a clutch body, a synchronizer ring and an idler gear, can synchronize a transmission having toothed wheel gears. The invention furthermore relates to an entire synchronizing system having a synchronization piece according to the invention. A full-servo synchronization system is also presented.

16 Claims, 11 Drawing Sheets

FOREIGN PATENT DOCUMENTS

| | | |
|---|---|---|
| EP | 0 144 962 A2 | 6/1985 |
| EP | 0 897 066 A1 | 2/1999 |
| EP | 1 517 064 A | 3/2005 |
| EP | 1 624 212 A1 | 2/2006 |
| EP | 1 750 025 A2 | 2/2007 |
| EP | 1 750 025 A3 | 1/2008 |
| GB | 1 502 914 A | 3/1978 |
| WO | WO 9 533 140 A1 | 12/1995 |

OTHER PUBLICATIONS

European Search Report, EP 07 11 4317 dated Apr. 23, 2008.
MerriamWebster on-line, definition of finger, <http://mw2.merriam-webster.com/dictionary/finger> visited Aug. 23, 2010.
Hacki., et al. Kyowa High Performance Synchronizer, 2006, pp. 171-192.

* cited by examiner

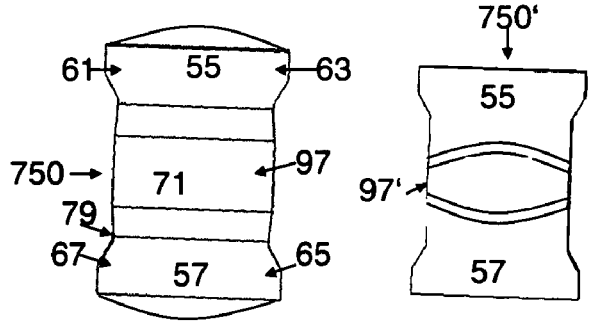
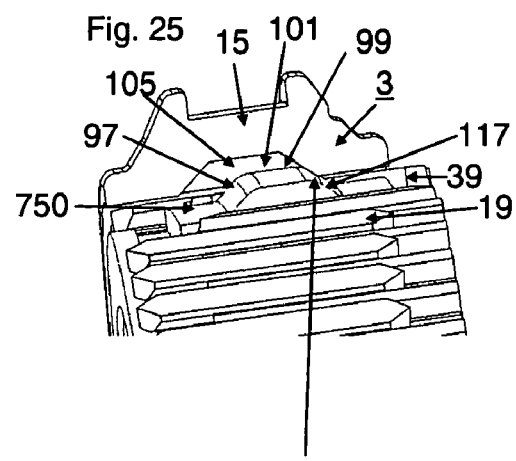
Fig. 23   Fig. 24
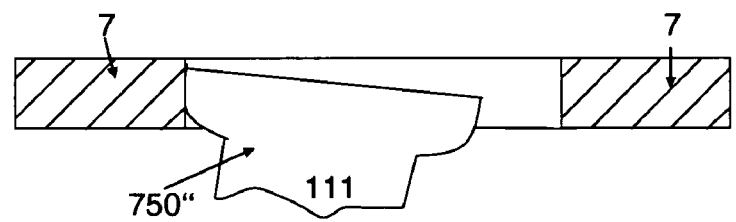
Fig. 26

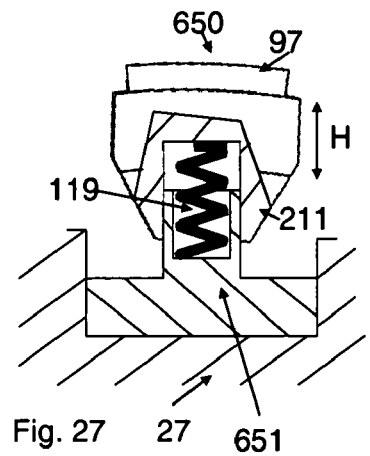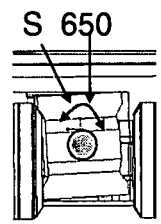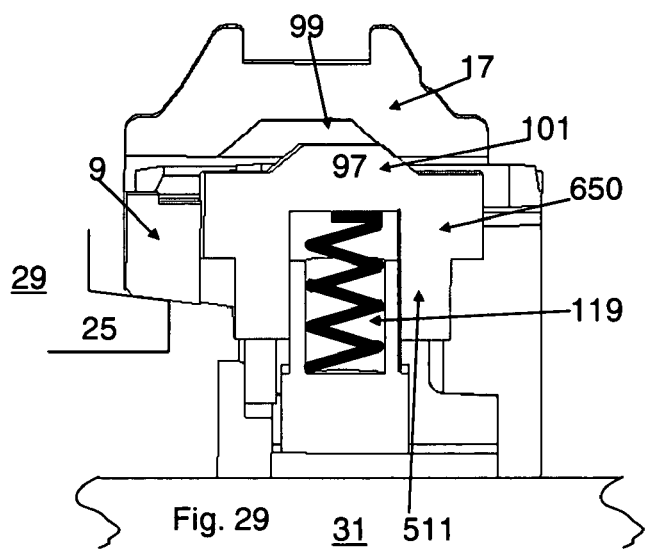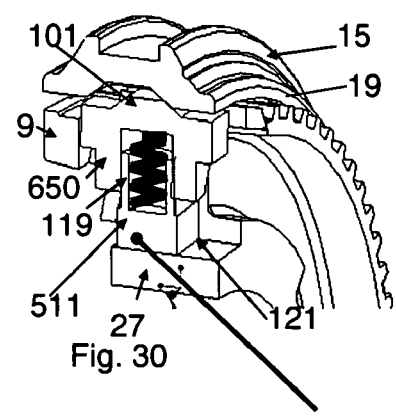

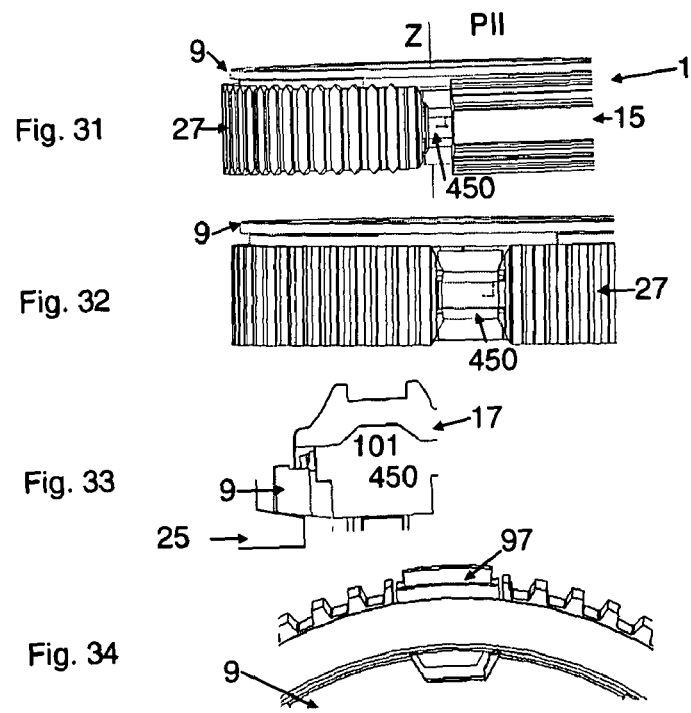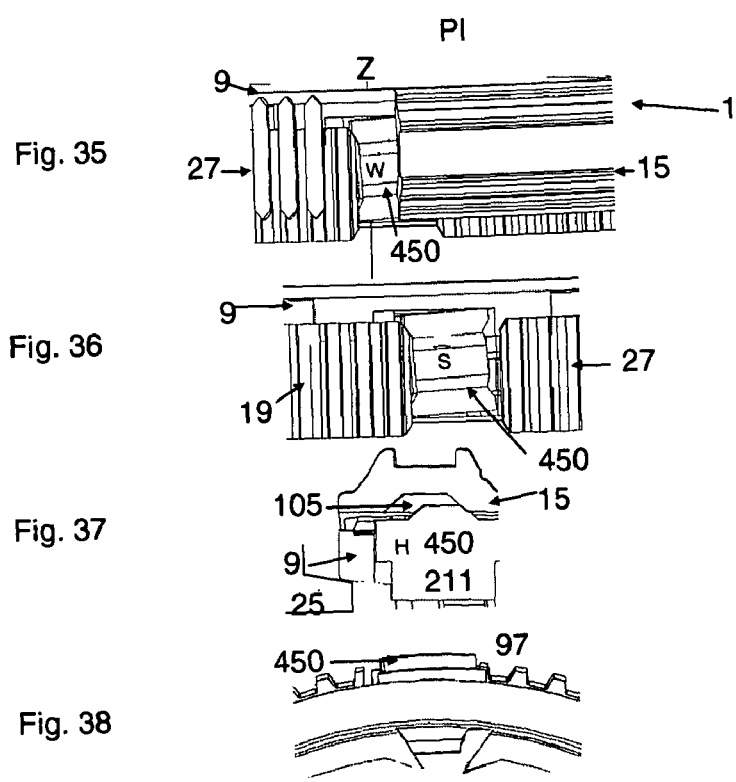

TRANSMISSION SYNCHRONIZING SYSTEM, IN PARTICULAR, IN THE FORM OF A SERVO SYNCHRONIZING SYSTEM

PRIORITY CLAIM

This application claims the benefit of German patent application DE 10 2006 044 352.7, titled "Getribesynchronisierung, insbesondere in der Form einer Servo-Synchronisierung," which was filed Sep. 18, 2006, the disclosure of which application is incorporated herein in its entirety by this reference.

FIELD OF THE INVENTION

The invention relates to a synchronization piece which, as part of a servo synchronization system comprising a sliding sleeve, a clutch body, a synchronizer ring and an idler gear, can synchronize a transmission having toothed wheel gears. The invention furthermore relates to an entire synchronizing system having a synchronization piece according to the invention. A full-servo synchronization system is also presented.

BACKGROUND

In the parlance of the transmission designer, a synchronization piece is also termed a pressure piece or synchronization pressure piece.

As presented in detail at the VDI conference "Getriebe in Fahrzeugen 2006" ("Transmission in Vehicles 2006") and set out on pages 171-192 of the corresponding conference proceedings, published by VDI-Wissenforum, ISBN 3-18-091943-4, a KYOWA HIGH PERFORMANCE SYNCHRONIZER (KHS) is now known in the specialist domain. This synchronizer, as a H element, is capable of performing a locking synchronization according to the servo synchronization principle. The principle of servo synchronization is set out in greater detail in, for example, U.S. Pat. No. 3,548,983 and, in the same document family, the German document DE 1 924 724 C (published on Nov. 20, 1969, patent holder Nissan Motor Co.), the full content of the explanations relating to servo synchronization in that publication having been incorporated by reference herein.

A synchronization system is termed a servo synchronization system if the energy from the torque of the gear wheels that are capable of rotation relative to one another is used to facilitate the synchronization operation. It would also be advantageous, in the case of a servo synchronization system, to reduce the force required for unblocking between the sliding sleeve and the synchronizer ring. Normally, even in the case of servo synchronization systems, the unblocking force is to some extent greater than the synchronizing force to be applied through the shifting operation. The shifting force applied to the synchronization system via the shift lever of the gearshift linkage is amplified in the case of a servo synchronization system.

Further ways of advantageously utilizing the synchronization moment in the case of a transmission synchronization system are to be found in, for example, U.S. Pat. Nos. 4,573, 371, 4,674,614 and 5,924,535. U.S. Pat. No. 5,924,535 and its cross-references refer to the use of the synchronization moment as "self-energizing" synchronization with use of the ramp friction. The full content of the descriptions relating to the servo synchronization according to the latter document has been included herein by reference. It is to be emphasized that in some cases the documents refer to ramp friction or self-energizing use of the meshing operation, when what is meant thereby is servo synchronization.

Known from DE 1 650 814 A is a ball-type pressure piece for any synchronizer ring composed of three balls arranged in succession. The pressure piece is located beneath an expanding circular-ring segment. A radial servo synchronization principle is realized by means of the expanding effect of the circular segment, in particular its two ends.

The wobbling of two opposing synchronizer rings can be prevented (see, for example, DE 10 2004 036 507 B3 and DE 24 31 324 A) in that a pressure-piece type element extends from one synchronizer ring to the next synchronizer ring, and engages in the two mutually facing synchronizer rings. The two synchronizer rings are thereby braced in relation to each other.

Compared with the earlier synchronization pressure pieces, the known H pressure piece is distinguished by its simplicity. It can be integrated into known synchronization systems without any need for substantial modification of the other parts. This means that the resource requirement for modification is limited in the case of introduction of an H pressure piece, and customer clearance is more easily obtainable. A disadvantage is the necessity of a repeat, separate hardening of the ends of the H piece during production. In addition, in order for the ends to withstand the forces that occur, their walls must be of a certain minimum thickness. Owing to its shape, an H piece has a minimum width. The hub is round, with the result that, owing to its curvature, the H piece exerts a certain notch effect. As in the case of a conventional synchronization system, the unblocking force is not reduced.

SUMMARY OF THE INVENTION

Desirably, to be achieved, therefore, is that of creating, as an alternative, an improved pressure piece which can be used satisfactorily as a servo synchronization pressure piece. In addition, the inventors of the invention have the aim of creating a complete synchronization unit based on a pressure piece according to the invention, and of using this unit in a transmission synchronization system.

A pressure piece according to embodiments of the invention is presented. A transmission synchronization system according to embodiments of the invention is also given. A compact, self-contained unit for use or integration in a motor vehicle transmission is given in other embodiments of the invention. According to still other embodiments of the invention, a unit can operate according to a method as presented herein below.

Advantageous developments are further given by embodiments of the invention.

In the context of the invention, an I-shaped pressure piece is understood to be a part that has a waisted, i.e., constricted portion, and has wider portions in other regions adjoining the waisted region. In terms of its portions, the pressure piece has the appearance of a capital printed letter I. In modern manual-shift transmissions, it is usual to select synchronization arrangements disposed in a mirror-image arrangement. Depending on the displacement of the sliding sleeve, synchronization can be effected from a drive shaft to, alternately, two different, mutually facing idler gears. A pressure piece according to the invention therefore has two transverse regions which continue its middle portion. This design is beneficial in advantageously utilizing the torque from the drive shaft.

In the case of one-sided synchronization arrangements, it is possible to dispense with one of the two transverse regions.

The functioning of a then somewhat non-symmetrically constructed pressure piece follows the principle of the invention.

The following uses the general, usual parlance of transmission designers for describing the different phases of a transmission synchronization operation—frequently divided into five phases—that uses a sliding sleeve or shift sleeve. In this connection, the terms synchronization phase and blocking phase denote the state in the motion sequence at which the teeth of the synchronizer ring come into bearing contact and remain in bearing contact with the teeth of the shift sleeve. The unblocking operation then begins when synchronism has been established between the shaft and the idler gear and the bearing contact between the teeth of the shift sleeve and those of the synchronizer ring is on the point of disengaging as a result of mutual rotation. The invention can be used in already known transmission synchronization systems.

In the case of synchronization units in which transmission synchronization occurs, the synchronization pressure piece is an essential component. In the case of change-speed transmissions such as, for example, manual shift transmission of motor vehicles, the synchronization pressure piece provides for an initial engagement in the synchronizer ring, which may be an outer synchronization ring. If the synchronization pressure piece is designed as an I shape, it can be mounted in its middle region, for example by means of a central pin, in such a way that it can execute a servo synchronization motion by a tilting motion. Bevels can be provided in the corner regions. The bevels contribute towards better bearing contact on the grooves and recesses of the mating surfaces. Tilting motions refer to those motions in which the pressure piece can execute either horizontal or, also, vertical reciprocating motions within a certain angular range, preferably all motions, said motions being about a, preferably central, mounting point. The mounting, and the type of mounting, contribute to the satisfactory realization of the principle according to the invention.

In the case of one design, the I shape of the synchronization pressure piece is achieved through a middle, longitudinal type region, which is delimited by hammer type transverse segments projecting over the middle region. In its length from one transverse segment to the other, the pressure piece is designed so that it can extend over the width of a hub of the transmission shaft. The transverse segments extend at a virtually right angle, preferably a 90° angle, relative to the middle portion. The I-shaped pressure piece is flat overall. The middle, overall longer, region is much narrower than the transverse segments. In the case of exemplary designs, division ratios of 1:1.2 or even 1:2 or even 1:2.5 may be selected as advantageous ratios between the width of the middle, waisted region and the transverse segments extending in the same direction. The shape of the pressure piece favors ease of production as compared with known pressure pieces, e.g., in the case of many designs, it is possible to dispense with a subsequent case-hardening of the bearing and contact parts of the pressure piece. The shape also reduces the requirements in respect of wear.

The pressure piece may have beveled corner regions. A middle portion of the pressure piece faces outwards at its junction point, merging thus into the transverse segments. The outwardly facing bevels are disposed on the inner surface, i.e., the side facing towards the center of the I-shaped pressure piece.

At least one recess is provided in a hub of the shaft. The recess in the hub is shaped in such a way that similarly angled, beveled-off corner regions of the synchronization pressure piece can engage in the hub. The seating and engagement in the recesses is effected through horizontal angular displacement, preferably in the direction of rotation of the hub. The shaping is such that the pressure piece and its corresponding hub recess constitute a pair, and engage expediently in one another.

Yet further regions may be provided, beyond the central I shape of the pressure piece. Such a region may be a radial or an axial extremity such as, for example, a lug. In continuation of the central, middle portion, interrupted by the transverse segments, the lugs project, preferably on both sides, as extensions of the synchronization pressure piece, beyond the width of the hub, and are shaped in such a way that they can advance into recesses of a synchronizer ring of a transmission synchronization system. The portion of the pressure piece is in engagement during the synchronization phase.

If the pressure piece is considered as being in layers, according to one exemplary embodiment it has its widest layer at its upwardly facing surface, from which a conical instantaneous center of rotation may project. The layers underneath are narrower. The resultant side walls of the pressure piece thus extend inwardly.

The material used may be a sheet metal that renders the outer contour of the pressure piece. In this case, the pressure piece is hollow on the inside. The bottom layer is then the narrowest layer of the I-shaped core of the pressure piece. The inwardly extending side walls of the pressure piece form a certain blocking angle for the setting of an unblocking force upon the establishment of equality between the synchronizer ring and the shift sleeve. In many typical transmission designs, the shift sleeve is realized as a sliding sleeve, such that, in the following, the term sliding sleeve is used synonymously when this also refers to a pure shift sleeve.

Advantageously, the synchronization piece has been produced from a coherent metal sheet, by stamping, forming, bordering, offsetting or canting. These processing steps are used to produce bordered or rounded edges. A flat, elongate component is produced, in the approximate center of which it is possible to punch-in an instantaneous center of rotation. According to a further exemplary embodiment, the instantaneous center of rotation may also be in the form of a stamped-in or deep-drawn cap. Individual walls that do not perform any function can be left open in the three-dimensional body of the coherent sheet metal in order to save material, so as to produce a three-dimensional body in which individual sides and portions of sides have only partial surfaces.

A synchronization pressure piece according to the invention can be constructed to constitute a transmission synchronization system, together with a sliding sleeve, a synchronizer hub, a speed-change gear, a synchronizer ring and a clutch body, such that they all constitute parts of a servo synchronization system. Parts that have been tried and tested over the long term from conventional transmission synchronization systems may be used for many of the parts.

In the context of the invention, the term servo synchronization system is used when the torque of the drive shaft or of the components connected thereto is advantageously utilized in an amplifying manner and the necessary force to be applied, for example by means of the shifting force, is reduced during the synchronizing-on operation. The term full-servo synchronization system is used when the energy from the sliding sleeve can be transmitted to the pressure piece, in particular via a groove, and the unblocking operation is also facilitated from the opposing torque derived therefrom. Whether the system is a servo synchronization system or even a full-servo synchronization system depends on the design of the I-shaped bar, which is an essential part of the synchronization pressure piece. In the case of a full-servo synchronization by means of the pressure piece, there are a plurality of force and torque application points and regions in the synchronization pressure piece. In the simplest case, the synchronization pressure piece must have two application points. In the simplest case, a pure servo synchronization system, preferably having an I-shaped pressure piece; uses a torque via a side wall extending into an extremity.

The transmission synchronization system is to be realized in that the synchronization pressure piece capable of swivel motion has a virtually punctiform or lineal mounting, preferably in the middle portion of the waisted region, about which mounting a swivel motion can be executed, in the radial direction of rotation of the hub, in respect of the drive shaft located beneath the pressure piece. In addition, the synchronization pressure piece is mounted in such a way that a horizontal equalizing motion can also be executed. The mounting affects the degrees of freedom of the pressure piece and the running capability of the pressure piece.

A transmission synchronization system can be realized in motor vehicle construction in such a way that multiple synchronization pressure pieces are provided. The synchronization pressure pieces are disposed with a virtually uniform all-round distribution within the synchronization unit, such that the servo synchronization application or the full-servo synchronization application is provided symmetrically over the entire shaft. According to one exemplary embodiment, the transmission synchronization pressure pieces may be positioned at intervals of 120° over the revolution of the synchronization hub, in order to utilize the torque at three points and to synchronize uniformly over the circumference.

To create a full-servo synchronization system, the sliding sleeve may be provided with a radial groove, or accordingly with a multiplicity of radial grooves in the case of a plurality of synchronization pressure pieces, thus, for example, three longitudinally extending grooves in the case of three synchronization pressure pieces, the grooves having a taper angle, in particular in their edge regions. An end of a central pin of the synchronization pressure piece reaches into the radial groove, thereby enabling force to be applied to the sliding sleeve during the blocking operation for the purpose of equalizing rotational speed between the drive shaft and idler gear and for unblocking upon establishment of equality of rotational speed. By means of a central pin or central raised portion of the pressure piece, designed either as a single piece or, also, as two pieces, the sliding sleeve is moved in a rotational direction in an amplifying manner, with utilization of the torque.

If the synchronization pressure piece is designed as a full-servo synchronization pressure piece, the mounting pin, suitable for a groove engagement, is preferably disposed in center of the pressure piece. The synchronization pressure piece engages in a recess of an outer synchronization ring. The transverse segments of the synchronization pressure piece are provided with bevels. The servo synchronization pressure piece is able to execute an equalizing motion in the radial direction in respect of the outer synchronization ring. The sequence of the motion is usually designed in such a way that the pressure piece has first executed a swivel motion towards a recess of the hub of the drive shaft. The swivel motion renders the torque usable by the hub, via the pressure piece.

According to one exemplary design, the recesses that are preferably provided on the outer synchronization ring may be wedge-shaped or trapezoidal. During the blocking operation, in the phase of equalizing rotation speed between the clutch body and the outer synchronization ring, the pressure piece engages in the recess on the outer synchronization ring; there may be, for example, three pressure pieces or also, for example, five or six pressure pieces. When equalization of rotational speed has occurred, i.e., following completion of rotational speed equalization, the respective pressure piece can remain in an unblocked state in its assigned recess, and has no further effect.

The radial groove in the sliding sleeve is shaped, in respect of its taper angle, in such a way that, in the synchronization phase from the blocking to the unblocking by the pressure piece, occurring between the synchronizer ring and the sliding sleeve, an end of the central pin comes into bearing contact and transmits force. In respect of its geometry or its surface bevel, the lateral surface on the synchronization pressure piece is designed to match the course of the recess of the outer synchronization ring. The bevel is preferably one that faces downwards through an angle out of the surface of the synchronization pressure piece or out of the top of the synchronization pressure piece, towards the shaft. This design reduces the frictional action between the pressure piece and the outer synchronization ring at the contact surface, in order to facilitate unblocking. The unblocking motion, which may be a radial motion, is affected favorably by the mounting of the pressure piece during the unblocking phase.

The pressure piece extends, for example by means of projecting lugs, beyond the core region, which is in the shape of the capital letter I. The lugs may be in the form of a wedge, a cylinder or a mounted roller. The lugs are thus extremities. Appropriate extremities may be provided in the axial or the radial direction, in particular on the body of the pressure piece. The lugs assume the function of initial engagement in the outer synchronizer ring.

The pressure piece may be mounted, separately from its base, on a resilient element. The element may be a detent mounting. The arrangement with a resilient, compressible, elastic element provides for a slight raising motion of the pressure piece during insertion into the sliding sleeve groove. A resilient element may be a spring, in particular a spiral or compression spring, guided in the direction of loading in a piston-type opening which encloses it. The guidance effects height stabilization of the spring. The base may additionally be mounted in such a way that it can execute a displacing longitudinal motion in the driving direction. The further degrees of motional freedom of the pressure piece with secure guidance help to improve the equalizing motion of the pressure piece during the synchronizing operation.

Particular features of the synchronization method according to the full-synchronization principle, preferably with components according to the invention, are the advantageous utilization of the torque, both for reducing the necessary blocking moment and for reducing the unblocking force required. The design shape of the pressure piece and of its mounting and contact points makes it possible to set the blocking security of the pressure piece. In the case of a full synchronization system, an embodiment according to the invention has at least one groove, preferably three or five grooves, a pressure piece or, also, a plurality of pressure pieces, and a shaft hub with a corresponding number of recesses for the individual pressure pieces. If, for example, an I-shaped pressure piece is guided centrally with an engagement in the groove, the unblocking force and the synchronization force can be reduced in equal measure, as compared with pressure pieces without servo synchronization. There is to be no unblocking before equality of rotational speed is attained. The design setting of parameters, resulting from the shape and structure of the surface, allows a blocking security of greater than 1 to be set.

The shift force on the synchronization unit, i.e., the externally applied force, for example via the gearshift linkage, is amplified during the synchronization procedure. An appropriate amplification factor can be set through the dimensions of the pressure piece, through the groove in the sliding sleeve, through the radius or the radii of the servo bevels, and through the synchronization cone radius. The amplification factor relates both to the blocking force and to the unblocking force. The synchronizing moment or the frictional moment is utilized. The shift force is less than the force applied for synchronizing.

The shift force necessary for synchronizing can be reduced with the use of a synchronization pressure piece, according to the invention, that has a double hammer shape with projecting stems, also described as in I shape with lugs, the pressure piece being mounted so as to be capable of swivel motion about a central mounting point, and being in engagement, depending on the respective swivel position, both with a recess in the hub and at a bevel in the groove of the sliding sleeve. As a result, the number of synchronization cones can be reduced, in particular in the lower gears. The invention departs from the widely observed tendency to realize the necessary shift forces through the use of more and more synchronization cones. Instead of having to use two or three synchronization cones for a first or second gear of a manual shift transmission of a motor vehicle, a synchronization unit according to the invention, having a full-servo pressure piece, can manage with only one cone. A light, easily produced pressure piece such as, for example, a multiply formed sheet metal piece, is advantageous. The geometries and the angles are used to set the servo action, the necessary shift force and the torque to be utilized. The blocking security, the amplification factor and the self-locking security are set as required through the geometric portions selected on the synchronization pressure piece and at the transitions between the synchronization pressure piece and the components bearing on or in contact with it. It is thus possible to select a geometric pairing which increases the blocking security in the same measure as the servo amplification factor.

The unblocking force for the part of the pin that is inserted in the lower groove of the sliding sleeve, i.e., on the inside of the sliding sleeve, is obtained from the shift force in dependence on the bearing contact surface, which can be set by means of a contact angle. The servo amplification is obtained from the servo force plus the shift force, and constitutes a ratio relative to the shift force, with factors such as the cone radius, the coefficient of friction, the number of frictional surfaces, the radius of the wedge contact and the opening angle of the outer synchronizer ring being included in the ratio. An adequate blocking security (S>1) is achieved when the forces acting upon the pressure piece, i.e., acting outwards at the pressure piece from the center of the shaft, are greater than the action of force in the opposite direction, i.e., from outside, thus from above, upon the pressure piece, such that it cannot execute a downwardly directed yielding motion. The blocking security is directly dependent on the amplification factor. The amplification factor is set in such a way that the frictional moment and the servo moment are virtually or actually identical. The servo moment is proportional to the tangential force of the radius of the servo motion. The amplification factor can be set by means of the contact angle. The radius of the servo bevel and the selected cone angle are included in direct proportion in the amplification factor. Likewise, the number of frictional surfaces and the coefficient of friction that results from the friction material must be taken into account as increasing factors in the amplification factor (since they are to be included in the denominator). The self-locking security is obtained from the geometric ratios of the radius of the servo bevel to the cone radius, trigonometric factors of the friction of the contact angle and of the cone angle being included in the self-locking security. The ratio is set in such a way that no self-synchronization (SS>1) can occur. Both the shift force and the servo force are included in the frictional moment. Further factors of the frictional moment are the cone radius and the nature of the cones, as well as the cone angle. The tangential and vertical forces between the outer synchronizer ring, pressure piece and shift sleeve with groove can be set as required by the designer of a transmission synchronization system according to the invention, through the choice of contact bevels, contact surfaces and coefficients of friction, with the torque of the synchronization unit being advantageously utilized for the geometric pairing.

Embodiments of the invention thus serve to increase the gear-shifting performance during synchronization, while the parts to be used are easily produced and integrated. For example, the number of ring gears within the synchronizing system has been reduced. In addition, large torques can be transmitted with less force by means of a synchronization system according to the invention, with less cogging occurring in the transmission.

BRIEF DESCRIPTION OF THE DRAWINGS

The invention may be even better understood through reference to the following figures, wherein:

FIG. 23 shows a pressure piece in a domed design;

FIG. 24 shows an alternative of a further pressure piece in a domed design;

FIG. 25 shows a pressure piece in a domed design in an integrated state;

FIG. 26 shows the domed contact point between the pressure piece and a synchronizer ring;

FIG. 27 shows a pressure piece with detent element;

FIG. 28 shows a swiveled-in pressure piece according to FIG. 27;

FIG. 29 shows an integrated pressure piece with detent element;

FIG. 30 shows a longitudinally movable pressure piece with detent element;

FIGS. 31 to 34 show a pressure piece according to the invention in the neutral position, from different viewing angles;

FIGS. 35 to 38 show a pressure piece according to the invention in the blocking phase.

DETAILED DESCRIPTION OF THE INVENTION

Figure 1:
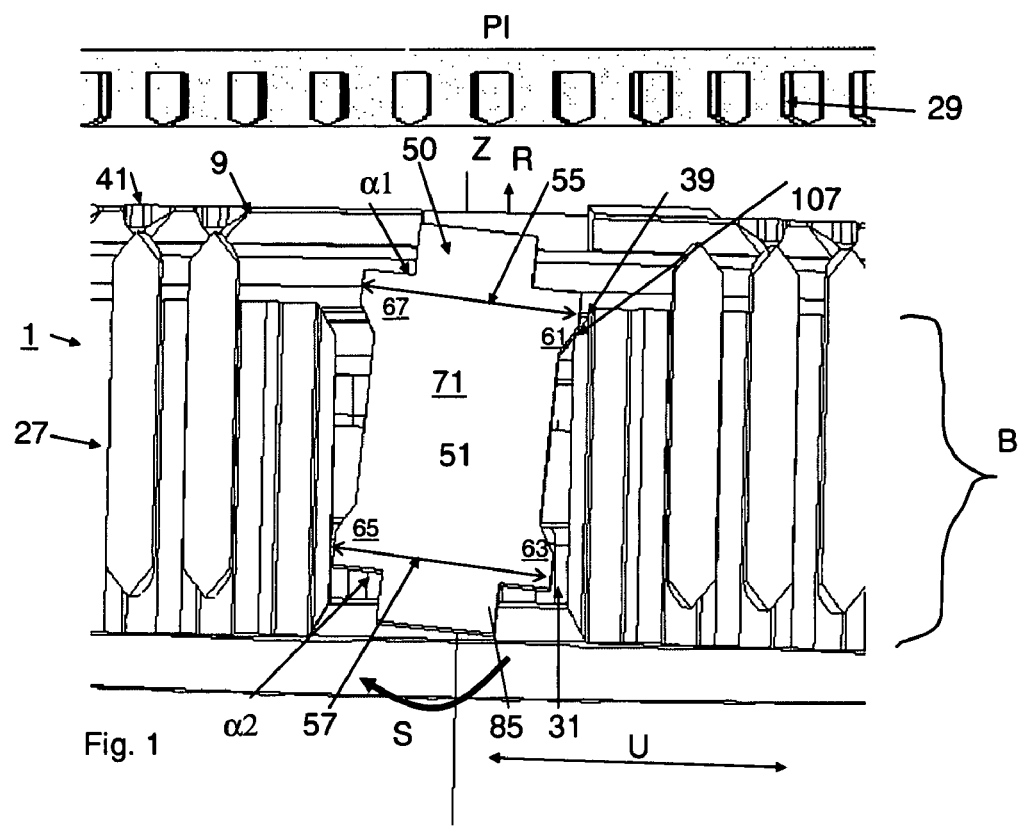
FIG. 1 shows a first exemplary embodiment of a pressure piece according to the invention.

FIG. 1 shows a pressure piece 50 according to the invention in swivel motion in the synchronizer hub 27, the individual contours of the pressure piece having been reduced to such an extent that particularly notable regions 61, 63, 65, 67 and 55, 57 can become apparent. As is known, a transmission synchronization system 1 according to a usual design is constructed with an idler gear 29, a first outer synchronization ring 9 having an appropriate number of stop teeth 41, and with a shaft 31. The synchronization unit 1 in this case ensures that synchronous operation is achieved between the idler gear 29 and the shaft 31 following synchronizing-in. The synchronization operation is effected with the aid of a pressure piece 50. The pressure piece 50, of which there may also be several over the circumference in the direction of rotation U of the synchronization unit of a transmission synchronization system 1, is located in a recess 39 of the synchronizer hub 27 in such a way that it can execute swivel-motion bearing contacts with one side, in a corner region 61, 63, 65, 67. The swivel motion S is effected through horizontal offsetting in the direction of rotation U of the synchronizer hub 27. In order to achieve offsetting and bearing contact of the pressure piece 50 in the region of the recess 39 on the synchronizer hub 27, the pressure piece 50 is provided with a suitable mounting 51 in the central region 71. The mounting 51 in the central region 71 of the pressure piece 50 may be a point mounting, for example, such that a respective corner region 61, 63, 65, 67—the corner regions being distributed quadratically on the pressure piece—can be brought into bearing contact on a respective recess 39 of the hub 27 in order to effect a blocking phase PI. The pressure piece 50 therefore has at least one synchro-servo bevel 107, which may also be provided in all corner regions 61, 63, 65, 67, i.e., four bevels. The pressure piece 50 has the appearance of a block. The pressure piece 50 has a coherent region. In its middle region 71, the pressure piece 50 is more waisted than in the regions that widen out, where the corner regions 61, 63, 65, 67 are. The corner regions 61, 63, 65, 67 create transverse segments 55, 57, which are virtually at right angles α1, α2 to the longitudinal axis of the pressure piece 50. The body region of the pressure piece thus terminates in the region of the synchro-servo bevel 107; the pressure piece 50 can be continued. In its body region, the pressure piece 50 has the shape of the letter I. The pressure piece 50 which, according to one design, has a flat structure and is narrow as viewed from the side, may have continuing lugs 85. In the region of the middle 71 and in the region of the lug 85, the pressure piece 50 is narrower than in the region of the first or second transverse segment 55, 57. Starting from the middle, approximately where the mounting 51 of the pressure piece 50 is located, the pressure piece has two parallel sides which diverge from each other at bevels 107 in the end region of the body, so as to form the transverse segments 55, 57. The pressure piece 50 is of such a length that the lugs 85 project out beyond the width B of the synchronizer hub 27. The transmission synchronization system 1 has an output direction R. In a neutral position, the central axis of the pressure piece coincides, in parallel direction, with the output direction R. During the blocking phase PI represented, the pressure piece 50, through the swivel motion S, swivels out of this direction and departs from the central axis Z. In this case, the pressure piece 50 makes contact with the synchronizer hub 27 via the synchro-servo bevel 107. Through a swivel motion which follows the drive shaft in the direction of rotation, the pressure piece 50 is thus able, in its recess, to convert and utilize the torque from the rotary motion of the transmission, advantageously amplifying it during synchronizing-on from the synchro-servo bevel 107 to an extremity 85.

Figure 2:
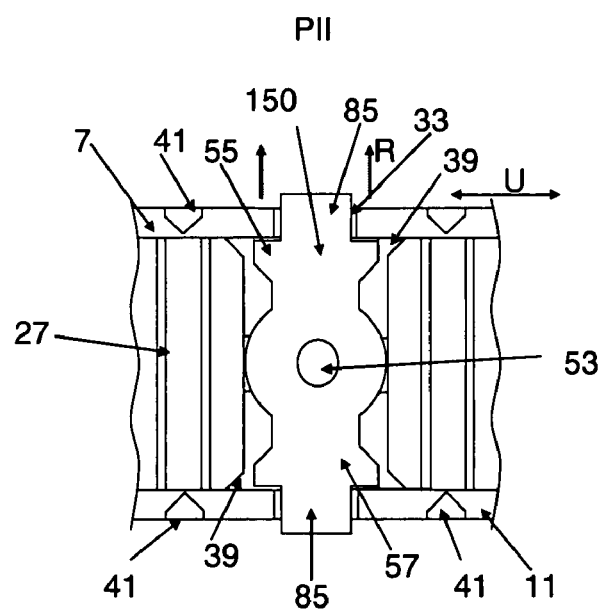
FIGS. 2 and 3 show an alternative exemplary embodiment of a pressure piece according to the invention.
Figure 3:
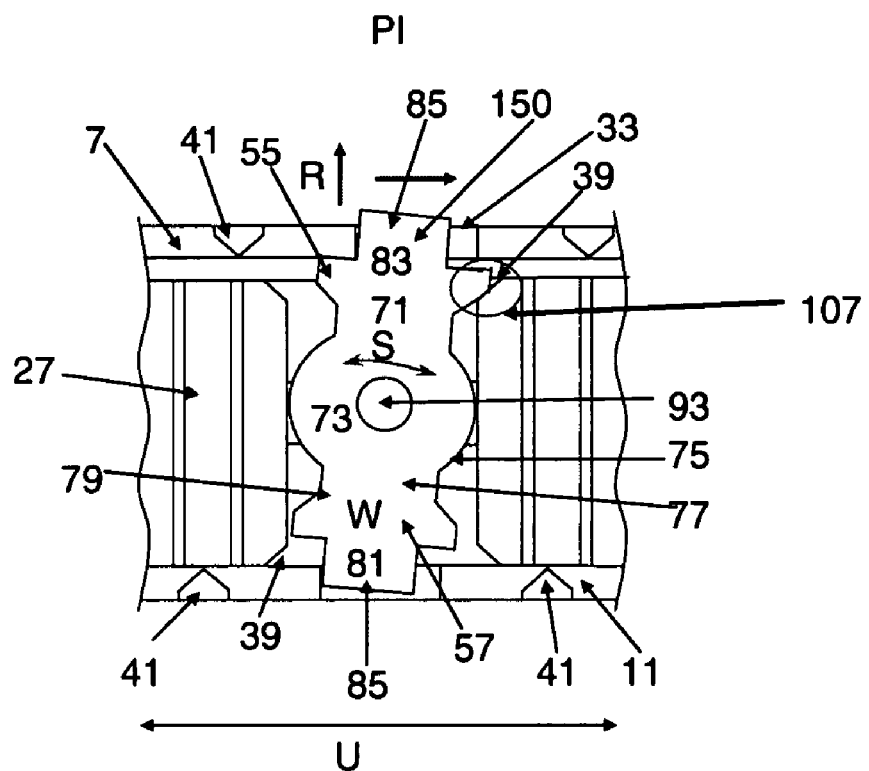

FIGS. 2 and 3 show an alternative embodiment of a substantially I-shaped pressure piece 150, once in the blocking phase PI according to FIG. 3, and once in the neutral position PII according to FIG. 2. On both sides of the pressure piece 150 the end regions 81, 83 terminate in lugs 85. Located between the end regions 81, 83 is the middle region 71 which, however, does not occupy the entire region of the pressure piece 150; instead, the first and the second transverse segment 55, 57 are also provided between the lugs 85 and the middle region 71. In the middle region 71 there is a middle portion 73, which is disposed in the form of a cylinder, or about an instantaneous center of rotation 93, as a mounting region for the pressure piece 150. The pressure piece thus has an inner region 77 and an outer region 75. If the contour of the surface in the outer region 75 is traced out, a circular shape is obtained, which is adjoined by a cross shape. The pressure piece thus has the appearance of a double cross, with a cylinder underneath. The pressure piece 150 is located in the synchronizer hub 27. Since it is mounted in the region of the instantaneous center of rotation 93, the exterior of the pressure piece 150, the outside 75, is able to engage in the recess 39 of the synchronizer hub 27. The synchro-servo bevel 107, which is particularly evident in the blocking phase PI, is constituted through the synchronizer piece 150 effecting bearing contact via one of its bevels. As indicated by the arrows, as a result of the swivel motion S the pressure piece 150 moves laterally out of its output direction R, which coincides with the shaft output direction, into the direction of rotation U, and thus creates the bearing contact with servo action in one direction. The mounting of the pressure piece allows it to effect a radial motion W, in addition to a swivel motion S. The synchronizer rings 7, 11 have at least one recess 33, in which a lug 85 can engage. As is usual, the synchronizer rings 7, 11 are provided with stop teeth 41. Beneath the instantaneous center of rotation 93, for the purpose of mounting a mounting pin 53 can extend outwards, away from the center of the shaft, the pressure piece 150 being mounted on the mounting pin so as to be capable of rotary, swivel and radial motion. In a double synchronization, the recess 39 is present at the first synchronizer ring 7 and at the second synchronizer ring 11. Owing to the torque and the synchronizing operation, the pressure piece 150 moves to and fro with rotary motion between the blocking phase PI and the neutral position PII, being able to change between a position parallel to the output direction R and a displaced position.

Figure 4:
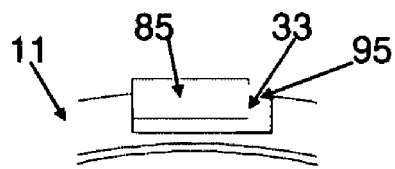
FIG. 4 shows the engagement of a pressure piece in the synchronizer ring.

FIG. 4 shows how the lug 85 is able to engage in one of the recesses 33, for example of the second synchronizer ring 11, and in so doing maintains a certain clearance 95 from a side of the synchronizer ring recess, as viewed in its absolute dimensions. A clearance is maintained from the side more remote from the side of the servo-synchro bevel 107 (not shown) that is used.

Figure 5:
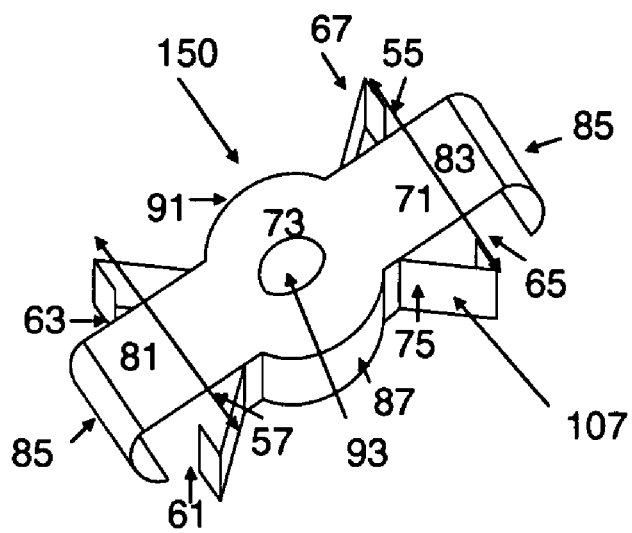
FIG. 5 shows an alternative design of a pressure piece according to the invention, as a sheet metal piece.

In FIG. 5, the pressure piece 150 represented in top view in FIGS. 2 and 3 is represented on its own, as a sheet metal embodiment; the pressure piece is a coherent sheet metal part which has attained its final form through multiple bending, bordering or edge-turning, depending on the production process performed. Viewed from the surface, the pressure piece 150 has two parallel longitudinal edges 91, which diverge in the manner of a protuberance in the region of the instantaneous center of rotation 93. The instantaneous center of rotation 93 is located in the middle portion 73 of the pressure piece 150. In the region of the end regions 81, 83, the sheet metal is bent over convexly, to form the lugs 85. The corner regions 61, 63, 65, 67 are formed by pronounced canting-off beneath the edge 91, such that the exterior 75 of the pressure piece 150 has the synchro-servo bevel 107 on the lateral surface in each case. The synchro-servo bevel 107 terminates at the broadest point of the transverse segment 55, 57, at which points the sides are folded over inwards at an angle. Viewed from the lugs 85, the pressure piece 150 thus has two side walls, of which the first side wall can be seen beneath the edge 91 in FIG. 5. The pressure piece 150 is flat overall. Beneath the surface, the pressure piece 150 is hollow. The pressure piece 150 has four laterally angled arms which extend obliquely, which can also look like ears, their bevels corresponding with the synchro-servo bevels.

Figure 6:
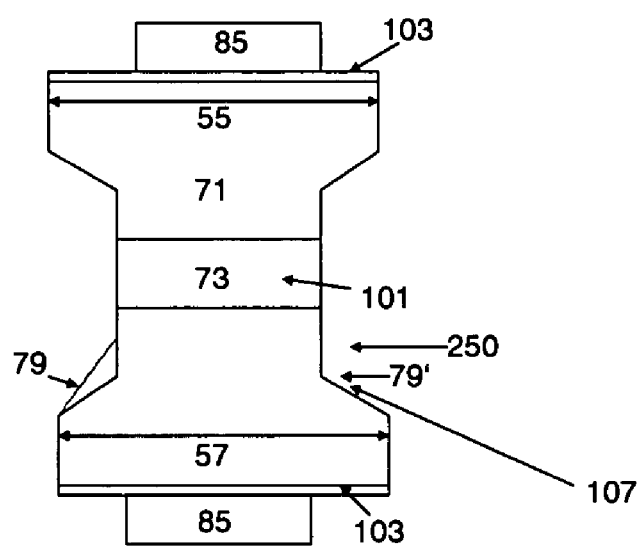
FIG. 6 shows an alternative pressure piece functioning as a full-servo pressure piece.

FIG. 6 shows a further pressure piece 250 according to the invention, which has the bevels for the synchro-servo bevel 107 on the inner surfaces 79, 79' of the transverse segments 55, 57. The bevel 79' is a multiply angled bevel, such that the individual bevels overlap each other. One bevel direction extends from the middle portion to the transverse segment. One segment direction extends from the surface to the underside. Thus, the bevel 79' is not merely one plane in space with only one solid angle, as compared with the I-shaped pressure piece, having instead two solid angles. As in the case of the pressure pieces 50 of FIG. 1 and 150 of FIGS. 2 and 3, respectively, the plan view of the pressure piece 250 is again in the shape of a butterfly, with two lugs 85. The pressure piece according to FIG. 6 differs from the previously represented pressure piece 150 in its middle region 71, in which a middle portion 73 projects as a sleeve actuation element, in particular in the form of a transverse element 101, from the surface of the pressure piece 250. Also provided is a friction neutralizing face 103 towards the lugs 85, i.e., at the end of the body region, where the transverse segments 55, 57 extend. The pressure piece according to FIG. 6 thus has four synchroservo bevels at its outer regions 75, on the inner surfaces 79, 79', and additionally two further bevels as friction neutralizing faces 103.

Figure 7:
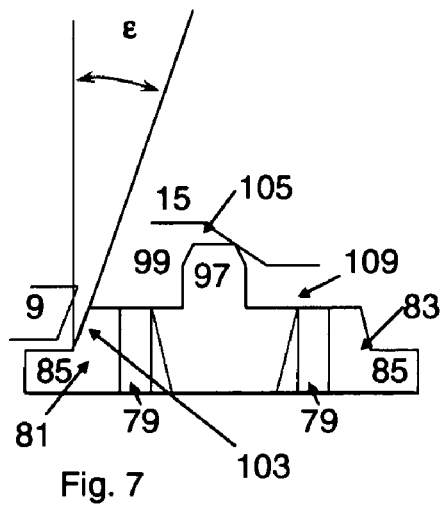
FIG. 7 shows a further alternative of a pressure piece according to the invention, with an enhanced unblocking angle.
Figure 8:
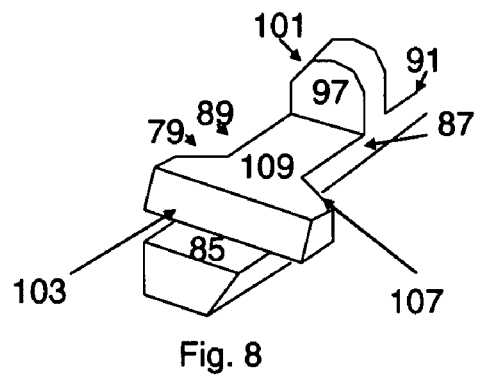
FIG. 8 shows a possible rearrangement of a pressure piece according to FIG. 7.

The functioning of the friction neutralizing face 103 may be more easily understood from FIGS. 7 and 8. The friction neutralizer has an angle $\epsilon$, a blocking angle, which corresponds with the angle of the outer synchronization ring 9 in the region of its recess. The angle $\epsilon$ is marked off from the perpendicular, which preferably is at right angles to the lug 85. The angle $\epsilon$ may be freely selected by the designer of the synchronization pressure piece, according to the mathematical relationships stated above. The angle $\epsilon$ is at right angles to the surface 109 of the pressure piece, from which the central raised portion 97 projects. The central raised portion 97 is designed for groove engagement 99 in the sliding-sleeve groove 105 of the sliding sleeve 15, so as to constitute a sleeve actuation element. At least one synchro-servo bevel 107, disposed on the inner surface 79 of the transverse segment and delimited by the edge 91, is respectively located both on the first side wall 87 and on the second side wall 89 of the pressure piece. The end regions 81, 83 thus have a many-layered or multilayer form; they are provided with different bevels, namely, the blocking angle bevel constituted by the blocking angle $\epsilon$, and the synchro-servo bevel 107, on longitudinal and transverse portions. The pressure piece has the appearance of multiply superimposed shortened bars, from the uppermost bar of which a gripping element for the sliding-sleeve groove 105 projects as a sleeve actuation element 101.

Figure 9:
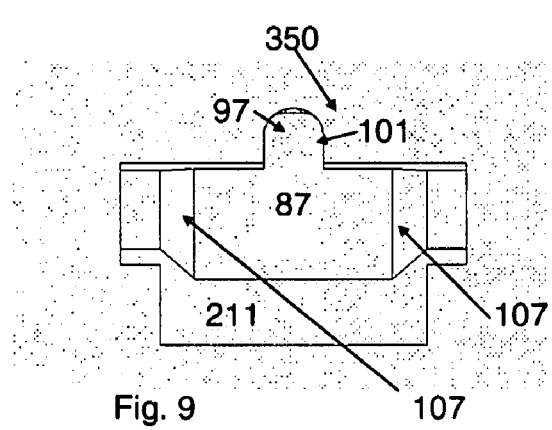
FIGS. 9 to 11 show a further alternative of a pressure piece according to the invention, from different perspectives.
Figure 10:
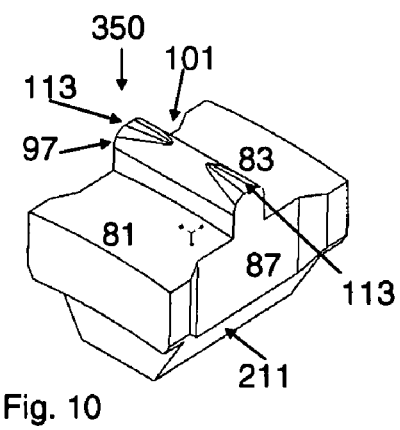
Figure 11:
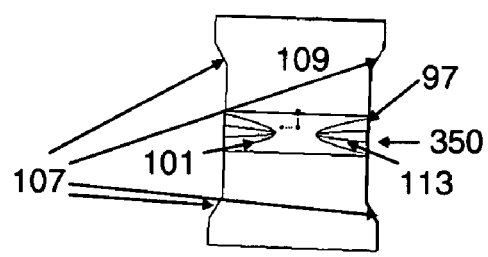

A further design of a pressure piece according to the invention can be seen in FIG. 9 to 11. FIG. 9 is a side view. FIG. 10 is a three-dimensional, oblique top view of the pressure piece, and FIG. 11 shows the pressure piece from above. The pressure piece 350 has a more solid appearance because of its base 211, which is in the form of a trapezium over the length of the pressure piece, less the outer portions of the end regions 81, 83. The shape of the base 211 allows the pressure piece to move laterally with a tilting or swiveling motion, whilst at the same time being fixedly mounted. Extending from the surface 109 of the pressure piece is a central raised portion 97, which has tilt bevels 113 on those portions of the pressure piece which go towards the lateral faces 87, 89. The central raised portion 97 serves as a sleeve actuation element 101. At a distance from the central raised portion 97 in the direction of the edge regions or end regions 81, 93, the synchro-servo bevels 107 face outwards from the narrower, inner part of the pressure piece 350, so as to form transverse segments. The side walls 87, 89 (89 is not visible) are coherent walls, with bevels for the synchro-servo bevel 107 which are disposed at the edge. The pressure-piece base 211 is likewise beveled in its extent, for the purpose of tilting the pressure piece. The base 211 fans out in the direction of the central raised portion 97.

Figure 12:
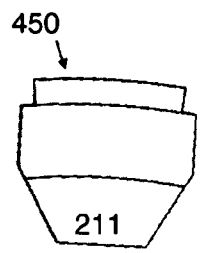
FIGS. 12 to 14 show a further alternative of a pressure piece according to the invention, from different perspectives.
Figure 13:
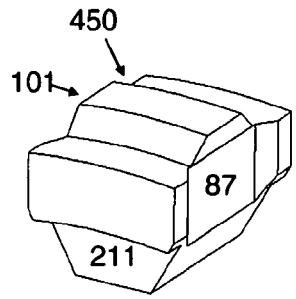
Figure 14:
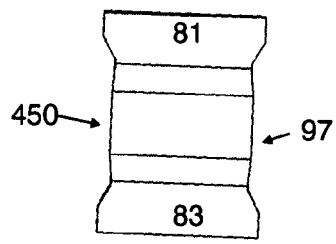

A further design of a pressure piece 450 according to the invention is given in FIGS. 12, 13, 14. The sleeve actuation element 101, in the form of a central raised portion 97, has bevels only towards the respective end regions of the pressure piece 450. The side wall 87 extends from the slide actuation element 101 as far as the obliquely adjoining pressure-piece base 211. The central raised portion 97 projects as a low raised portion—extending across the pressure piece 450— between the end regions 81, 83 and away from the pressurepiece base 211.

Figure 16:
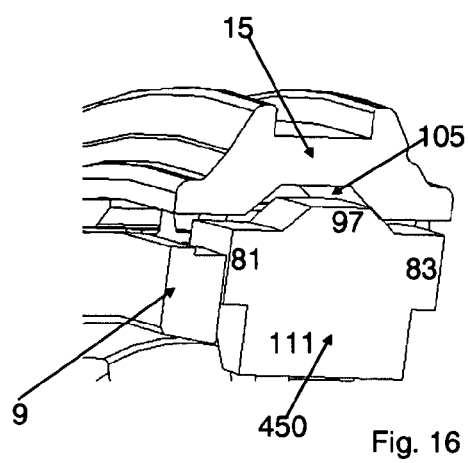
FIGS. 15 and 16 show a pressure piece fitted beneath a synchronizer sleeve.
Figure 15:
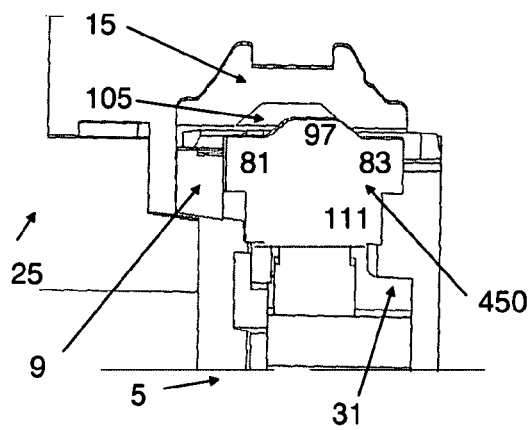

FIGS. 15 and 16 show the appearance of a pressure piece 450 provided with a pressure-piece base 111 in the lower part, on the side that faces towards the drive shaft 5 in the integrated state, beneath a sliding sleeve. The figures show the outlines of the pressure piece 450. The exact bevels of the pressurepiece base 111 and of the central raised portion 97 are indicated only. The angles of the bevels, or the exact form of the surface of the synchro-servo bevel 107 (not shown), of the central raised portion 97 and of the surface of the pressurepiece base 311 are a matter for the design engineer, who sets the actuation angle, for example the blocking angle $\epsilon$ or the angle of the synchro-servo bevel, without need for inventive activity beyond the scope of the invention. Adjoining the pressure piece 450 in the region of one of the two end regions 81, 93 is the outer synchronization ring 9 which, as is usual, by means of a clutch body 25 can perform the reciprocal synchronization braking operation using a synchronization bevel. The pressure piece 450 is located above the transmission shaft 31. At the highest point of the pressure piece 450 is the central raised portion 97, which engages in the sliding sleeve 15, at the sliding-sleeve groove 105. The engagement enables the outer synchronization ring 9 (or each optional synchronization ring) to be aligned through utilization of the torque. As can be seen from FIGS. 15 and 16, the invention is distinguished by the fact, inter alia, that it is possible to dispense with the teeth of the synchronizer ring. Effective synchronization is nevertheless possible with a synchronizer ring without teeth.

Figure 17:
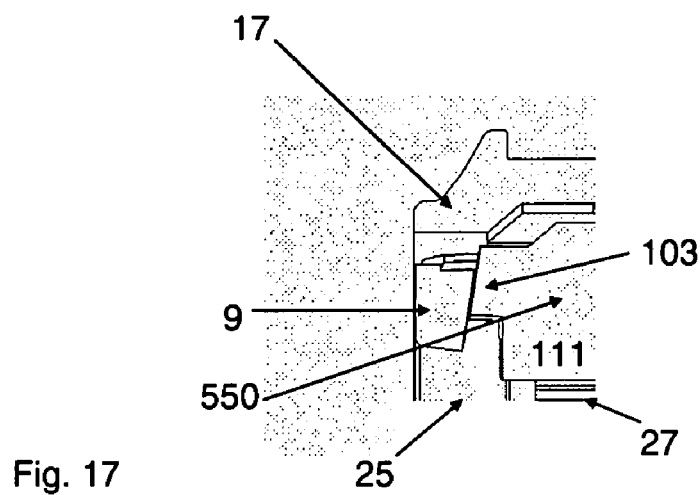
FIG. 17 shows a pressure piece fitted beneath a gear-change sleeve.

FIG. 17 shows a further pressure piece 550, which can cooperate with a shift sleeve 17, a synchronizer ring 9 as an outer synchronization ring, and a clutch body 25 in a synchronizer hub 27. Provided above the pressure-piece base 111, in the region of one end, is a friction neutralizing face of a friction neutralizer 103, the bevel of which matches the bevel of the outer synchronization ring. The outer synchronization ring has a bevel at the location where it can come into contact with the pressure piece 550. The friction neutralizer 103 is provided with an identical angle in a direction opposite to that of the synchronization ring 9.

Figure 18:
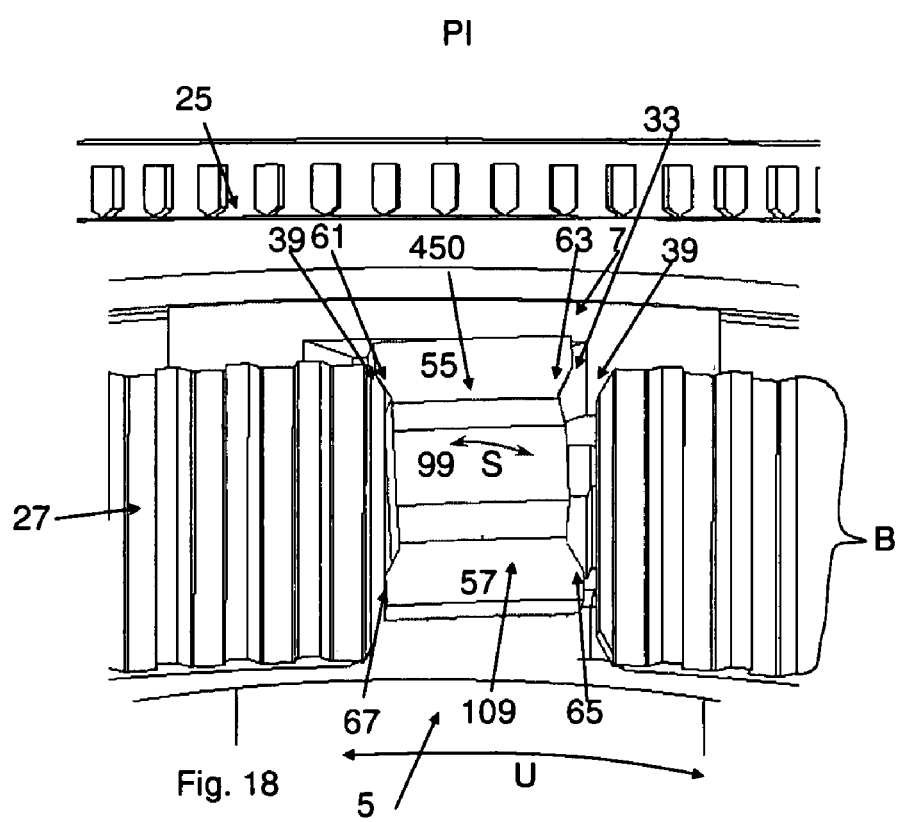
FIG. 18 shows a swiveled-in pressure piece in operation.

FIG. 18 shows a pressure piece 450 according to the invention in the blocking phase PI, seated on the drive shaft 5 and within the synchronizer hub 27. The clutch body 25 is provided with teeth, but there is no longer a need for teeth on the synchronizer ring 7 according to the exemplary embodiment of FIG. 18. At the location where the groove engagement 99 ends, the corner regions 61, 63, 65, 67 diverge outwardly, so as to form a first and a second transverse segment 55, 57. The bevels on the lateral faces of the pressure piece 450 match the recess 39 of the synchronizer hub 27; the recess 39 may be provided on both sides of the synchronizer hub, on both sides of the pressure piece 450. The synchronizer ring 7 has at least one recess 33, into which the pressure piece 450 is able to move. The pressure piece is mounted in such a way that it can execute a swivel motion S in the direction of rotation U, the width B of the synchronizer hub 27 being matched on the surface 109 of the pressure piece 450 such that the pressure piece 450 projects beyond the width B and can engage in the recess 33 of the synchronizer ring 7.

Figure 19:
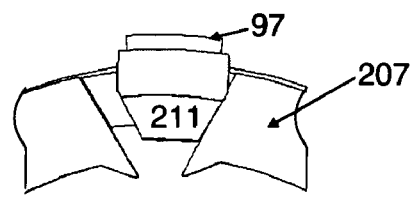
FIG. 19 shows a further form of engagement in a synchronizer ring.
Figure 20:
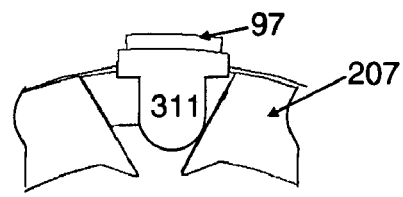
FIG. 20 shows a further engagement in a synchronizer ring.
Figure 21:
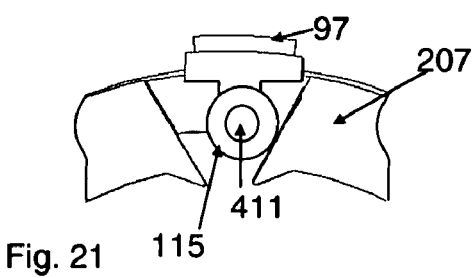
FIG. 21 shows a further engagement in a synchronizer ring.

FIGS. 19, 20, 21 show different engagements of a pressure piece for the engagement within the synchronizer ring 207. The pressure-piece base 211, 311 is also shown in different designs; of importance in the case of such a compact, elongate pressure piece with a central raised portion 97 is an arrangement such that the pressure piece is mounted so as to be capable of swivel motion. It is for this reason that the pressure-piece base 311 has a semicircular form. The pressure-piece base 211 has a trapezoidal form. A further possibility for the pressure-piece base consists in a round, roller engagement means 411 that is capable of rolling, for example mounted on a needle-roller bearing, within the synchronizer ring 207. The roller 115 according to FIG. 21 is disposed at the end of the pressure-piece base 411. The roller can engage in and roll on the recess of the synchronizer ring.

Figure 22:
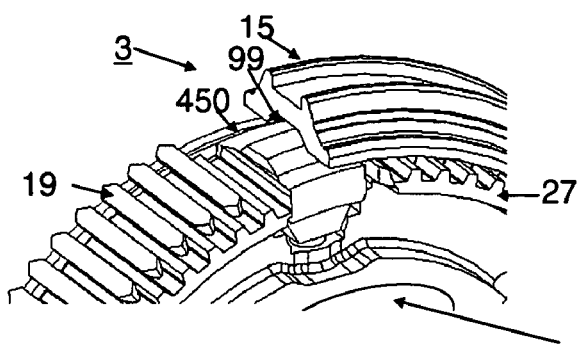
FIG. 22 shows an integrated pressure piece in a sectioned synchronization unit.

FIG. 22 shows a synchronization unit according to the invention, which is located above a drive shaft 5 with its synchronizer hub 27 and the synchronization pressure piece 450 intermediately disposed there beneath a sliding sleeve 15. The sliding sleeve 15 is provided with sleeve inner teeth 19, such that it can run in the synchronizer hub. A groove engagement 99 is disposed approximately in the center of the pressure piece 450, so that it can engage in the sliding sleeve 15 from underneath. The groove of the sliding sleeve matches the position of the pressure-piece raised portion.

FIG. 23 shows a pressure piece 750 according to the invention, which is represented with slight variation, as the pressure piece 750', in FIG. 24. Instead of straight edges, surfaces having a convex form are provided at contact points in order to improve rolling-in. This results in an improved contact behavior, but with the production resource requirement for the pressure piece being increased. The corner regions 61, 63, 65, 67 of the pressure piece 750 according to FIG. 23 terminate convexly above the respective transverse segments 55, 57, while having their synchro-servo bevel on the inner surface 79, as shown previously. The central raised portion 97 may be realized either with parallel edges in the central region 71 (FIG. 23) or with central raised portion edges 97' having a convex form (FIG. 24).

FIG. 25 illustrates how a pressure piece 750 according to FIG. 23 may be integrated. FIG. 25 shows the upper region with the sliding sleeve 15 and sleeve inner teeth 19. The hub has a recess 39, preferably a plurality of recesses 39, into which the pressure piece 750 can tilt. On its underside the sliding sleeve 15 has sliding-sleeve groove 105, which is provided on the inner surface and in which the central raised portion 97 can engage as a groove engagement 99 to enable the pressure piece 750, as a sleeve actuation element, inter alia, to effect alignment of the rotating parts. The central raised portion 97 is convex in form, such that it has a convex edge 117 at the surface. FIG. 25 shows a portion of the servo synchronization unit 3, which can realize a full-servo synchronization unit from a device for transmission synchronization.

As shown in FIG. 26, in the case of a pressure piece 750", further surfaces may also be convex in form, for example the surface of the piece 111, which is designed to be in engagement with the synchronizer ring 7. The pressure piece 750" is narrower than the recess provided for it in the synchronizer ring 7.

For the purpose of generating a further direction of motion, the previously shown pressure pieces may be provided with a detent spring 119 to facilitate a raising motion H, as represented in FIG. 27, so as to realize a pressure piece such as that denoted by 650. The detent spring 119 is located beneath the central raised portion 97, on the underside thereof. The detent spring faces in the direction opposite to that of the central raised portion 97. The detent spring 119 is located in a piston-type enclosure in the region of the pressure-piece base 211. Depending on its design, the detent spring also facilitates the swivel motion S of the pressure piece 650, as represented in FIG. 28. The detent spring 119 effects a connection between the pressure piece 650 and the detent mounting. The detent mounting 651 of the pressure piece 650 is located in the synchronizer hub 27.

To aid understanding, the principle represented in FIG. 27 has been transferred to previously represented integration variants in FIGS. 29 and 30. The shift sleeve 17 (FIG. 29) may be realized as a sliding sleeve 15. By means of a clutch body 25, an outer synchronization ring 9 can use the pressure piece 650 to effect synchronization from a transmission shaft 31 to an idler gear 29. The detent spring 119 presses the pressure piece, with its central raised portion 97, which operates as a slide actuation element in the transverse direction, into the groove engagement 99 of the shift sleeve. If the shift sleeve is moved, the resilient, yielding mounting of the pressure piece 650, for example realized by the detent spring 119, allows the pressure piece to execute a yielding motion. In the case of a sliding sleeve 15 according to FIG. 30, sleeve inner teeth 19 are advantageously provided. The pressure piece 650 according to FIG. 30 is located in a slide groove 121, enabling it to execute compensating motions towards the outer synchronization ring 9 and away from the outer synchronization ring 9 by longitudinal motion. The base 511 of the pressure piece 611 is realized in two parts, between which the detent spring 119 is located. The pressure-piece base can run in the synchronizer hub 27. The sleeve actuation element 101 engages in the sliding sleeve 15 from underneath, in the sleeve groove.

To further aid understanding, reference is made to FIGS. 31 to 34, which show the synchronization pressure piece 450 in a neutral position PII from various perspectives, and to FIGS. 35 to 38, which show the synchronization pressure piece 450 in an angled position, i.e., a blocking position of the blocking phase PI. The transmission synchronization system 1, shown in FIGS. 31 to 35, comprises, inter alia, a sliding sleeve 15 and an outer synchronization ring 9. An important element is the pressure piece, for example in the design shown in FIG. 33. A shift sleeve 17 (FIG. 33) may also be used instead of a sliding sleeve. The positions PI and PII are distinguished from one another in, on the one hand, the divergence of the pressure piece 450 from the central axis Z and, on the other hand, the executed raising motion H.

Figure 39:
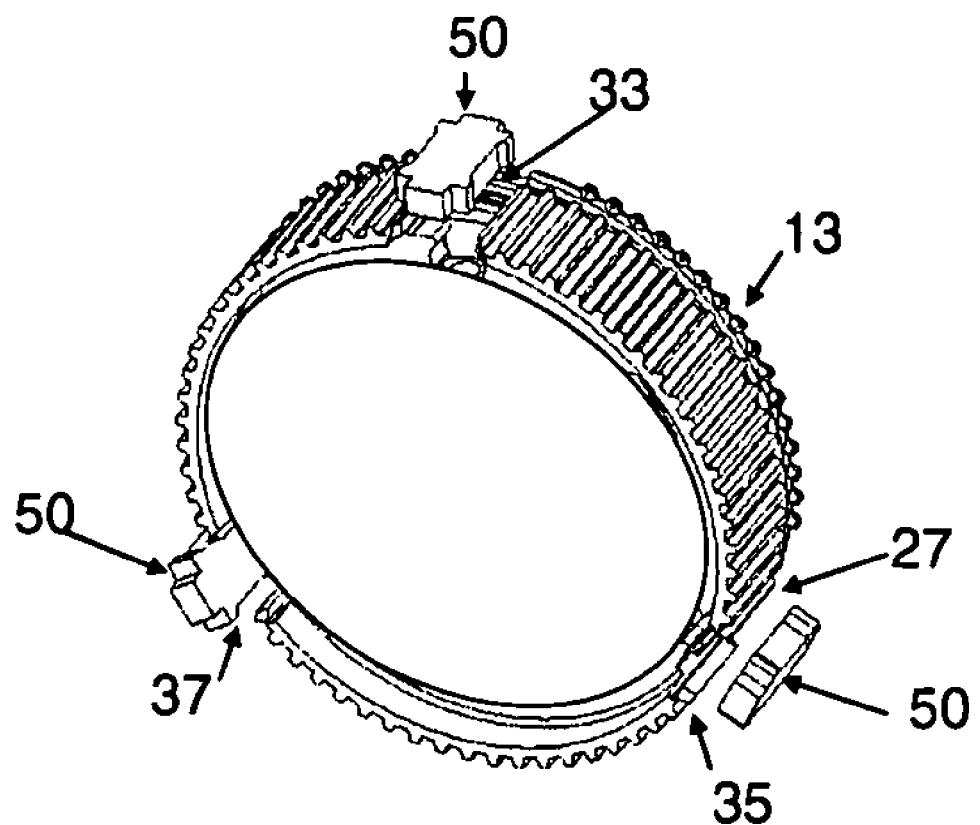
FIG. 39 shows a 3D representation of the structure, with a plurality of pressure pieces according to the invention.

FIG. 39 shows how three pressure pieces 50 may be disposed in a hub 27. Advantageously, the pressure pieces 50 are distributed uniformly over the circumferences, if a plurality of such pressure pieces are provided. In the case of three pressure pieces, the distance from one pressure piece to the next is 120°. Each pressure piece 50 thus has its own recess 33, 35, 37, in which it is inserted so that it cooperates with a synchronizer ring 13.

A person skilled in the art understands that a pressure piece according to the invention and a synchronization unit according to the invention may have numerous further variations. It is at the discretion of the application designer to design the surfaces of the basically represented structures of the synchronization pressure piece, which has simple coherence, such that they are without a multi-finger configuration, in the same longitudinal direction, convex, oblique, angled or round, in order to use the resultant contact surfaces between the synchronization pressure piece and the contact surface of the synchronizer hub, synchronizer ring and sliding sleeve to advantageously utilize moments and forces in the transmission in an amplifying manner, enabling the driver of a motor vehicle having a transmission according to the invention to engage and disengage the gears more easily with power assistance. The pressure piece according to the invention, as an I-shaped piece or, also, with only a central raised portion for engagement in the sliding sleeve, increases driving comfort through facilitated gear-shifting and reduced risk of grating noise.

As previously stated above, to a large extent the pressure piece may be of any shape; according to an aspect to be emphasized, torques from various sources are used within the synchronization unit, both for blocking and for unblocking during the synchronization phase. In one embodiment, a central pin is used; this pin, however, may also have a shape that is separate from the rest of the pressure piece. In a further embodiment, a central raised portion is provided. The lateral contact surfaces, which in the exemplary embodiments have an I-shape or hammer shape, should be mated to contact surfaces in the hub; other appropriate shapes are therefore conceivable. Owing to the absence of additional stop teeth, which frequently in the case of a full-servo synchronization system according to the invention are no longer necessary, the production of the synchronization ring is also simplified. In particular, a light formed part, for example made of sheet metal, used as a pressure piece in a transmission synchronization system capable of transmitting high torques, is a factor in the invention being widely accepted amongst transmission designers.

The pressure piece as presented has simple coherence. It no longer has a multiple finger structure. It does not have multiple parallel guidance in the output direction. The pressure piece does not have multiply occurring prongs to be arranged in the output direction. It does not include a fork, and is not dependent on a fork shape.

The invention offers a further advantage in respect of the sliding-sleeve teeth. The angle of the sliding-sleeve teeth, the so-called "roof angle," may be designed in any way. In contrast with conventional transmission synchronization systems, the possible angular range is not limited in order to ensure blocking security, as is otherwise usual. The designer of a transmission synchronization system according to the invention can therefore select such a roof angle that results in a maximally reduced meshing force.

LIST OF REFERENCES CHARACTERS

B Width of the synchronizer hub
H Raising motion
R Output direction
U Direction of rotation
α1 First right angle
α2 Second right angle
ε Blocking angle
E Neutralizer angle
W Radial motion
S Swivel motion
PI Blocking phase
PII Neutral position
Z Central axis
1 Transmission synchronization system
2 Synchronization unit
5 Drive shaft
7, 207 First synchronizer ring
9 First outer synchronization ring, or outer synchronizer ring
11 Second synchronizer ring
13 Second outer synchronization ring, or outer synchronizer ring
15 Synchronizer sleeve
17 Shift sleeve
19 Sleeve inner teeth
21 First speed-change gear
23 Second speed-change gear
25 Clutch body
27 Synchronizer hub
29 Idler gear
31 Shaft, or transmission shaft
33 First recess of the synchronizer ring
35 Second recess of the synchronizer ring
37 Third recess of the synchronizer ring
39 Recess of the hub
41 Stop teeth of an outer synchronizer ring
50, 150, 250, 350, Pressure piece
450, 550, 650, 750,
750', 750"
51 Mounting of the pressure piece
53 Mounting pin
55 First transverse segment
57 Second transverse segment
61 First corner region
63 Second corner region
65 Third corner region
67 Fourth corner region
71 Middle region
73 Middle portion
75 Exterior of the pressure piece, or outer region of the pressure piece
77 Inside of the pressure piece, or inner region of the pressure piece
79, 79' Inner surface of a transverse segment
81 First end region
83 Second end region
85 Extremity, in particular in the form of a lug, either as a surface extension or as a base extension
87 First side wall of the pressure piece
89 Second side wall of the pressure piece
91 Edge of the pressure piece
93 Instantaneous center of rotation 95 Clearance of the pressure piece
97, 97' Central raised portion
99 Groove engagement
101 Sleeve actuation element, in particular as transverse element
103 Friction neutralizer
105 Sliding sleeve groove
107 Synchro-servo bevel
109 Surface of the pressure piece
111, 211, 311, 411, Pressure-piece base
511
113 Tilt bevel of the sleeve actuation element
115 Roller, in particular mounted at the end of the pressure piece
117 Convex edge
119 Detent spring
121 Slide groove
651 Detent mounting

What is claimed is:

1. A synchronization pressure piece for synchronization of idler gears of a transmission by means of a shift sleeve and a synchronizer hub on a transmission shaft, wherein the synchronization pressure piece, as seen from an outside of the synchronizer hub in a radial direction, is formed as an I-shaped finger, with a middle, longitudinal region directed in an axial output direction of the transmission shaft, said middle, longitudinal region extends over a width of the synchronizer hub, said synchronization pressure piece is tiltably arranged in the synchronizer hub wherein the synchronization pressure piece has one or more beveled corner regions and at least one transverse segment, which extends virtually at a right angle to the middle, longitudinal region in a transverse direction relative to the width of the synchronizer hub, wherein the at least one transverse segment delimits the middle, longitudinal region of the synchronization pressure piece, the middle, longitudinal region of the synchronization pressure piece being overall longer and narrower than the at least one transverse segment, a ratio between a width of the middle, longitudinal region of the synchronization pressure piece and the at least one transverse segment ranging from 1:1.2 to 1:2.5.

2. The synchronization pressure piece of claim 1, wherein the beveled corner regions, facing outwards from the middle, longitudinal region of the synchronization pressure piece, are disposed on an inner surface of the transverse segment of the I-shaped finger, wherein a beveled corner region can engage, through a horizontal angular displacement, in a recess of the synchronizer hub, which is of a similar angular form.

3. The synchronization pressure piece of claim 1, wherein at least one end region of the synchronization pressure piece projects beyond an inner I-shape of the synchronization pressure piece in continuation of the middle, longitudinal region interrupted by the transverse segment, which the end region, as an extremity comprising a projecting lug, can advance into recesses of a synchronizer ring, the recesses of the synchronizer ring being wider than a width of the projecting lug.

4. The synchronization pressure piece of claim 3, wherein the synchronization pressure piece comprises two end regions that project beyond the inner I-shape of the synchronization pressure piece.

5. The synchronization pressure piece of claim 1, further comprising a mounting region for the synchronization pressure piece about an instantaneous center of rotation that is provided on at least one side of the synchronization pressure piece.

6. The synchronization pressure piece of claim 1, wherein the synchronization pressure piece comprises two transverse segments.

7. A synchronization pressure piece for synchronization of idler gears of a transmission by means of a shift sleeve and a synchronizer hub on a transmission shaft, wherein the synchronization pressure piece, as seen from an outside of the synchronizer hub in a radial direction, is formed as an I-shaped finger, with a middle, longitudinal region directed in an axial output direction of the transmission shaft, said middle, longitudinal region extends over a width of the synchronizer hub, the synchronization pressure piece tiltably arranged in the synchronizer hub, wherein said synchronization pressure piece is created from a contiguous sheet metal piece having multiply rounded or bordered edges, so as to produce a flat, elongate component having a central instantaneous center of rotation, convexly bent lugs in end regions, and corner regions with synchro-servo bevels on lateral surfaces of side walls, the side walls being folded over at an angle.

8. A transmission synchronization system, said transmission synchronization system comprising:
a transmission shaft;
a sliding sleeve;
a synchronizer hub;
a speed-change gear;
a synchronizer wheel;
a clutch body; and
a pressure piece,
wherein the pressure piece as seen from an outside of the synchronizer hub in a radial direction comprises a middle, longitudinal region directed in an axial output direction of the transmission shaft, said middle, longitudinal region extends over a width of the synchronizer hub, said pressure piece being formed as a waisted I-shaped bar arranged in the axial output direction of the transmission shaft, and capable of a swivel motion, the synchronization pressure piece having one or more beveled corner regions and at least one transverse segment, which extends virtually at a right angle to the middle, longitudinal region in a transverse direction relative to the width of the synchronizer hub, wherein the at least one transverse segment delimits the middle, longitudinal region of the synchronization pressure piece, the middle, longitudinal region of the synchronization pressure piece being overall longer and narrower than the at least one transverse segment, a ratio between a width of the middle, longitudinal region of the synchronization pressure piece and the at least one transverse segment ranging from 1:1.2 to 1:2.5.

9. A synchronization unit for use with a transmission, the synchronization unit comprising:
a drive shaft coupled with a synchronizer hub comprising a recess of the synchronizer hub;
a sliding sleeve;
at least one speed-change gear;
an outer synchronization ring comprising at least one recess of the outer synchronization ring and mounted so as to be movable; and
at least one pressure piece, wherein the at least one pressure piece, as seen from outside of the synchronizer hub in a radial direction, is formed, like an I-shaped finger, with a middle, longitudinal region directed in an axial output direction of the drive shaft, the middle, longitudinal region extends over a width of the synchronizer hub, the at least one pressure piece is disposed so as to be capable of a tilting motion in the synchronizer hub, the at least one pressure piece having at least one transverse segment, the at least one pressure piece having at least one bevel, wherein the sliding sleeve with a radial groove having a taper angle, in which groove there engages an end of a central raised portion of the pressure piece in a phase from a blocking to an unblocking by the pressure piece for the purpose of equalizing rotational speed between the clutch body and the sliding sleeve wherein the at least one pressure piece acting as a full-servo synchronization pressure piece being movable in such a way that it engages in the at least one recess of the outer synchronization ring, and, by way of the at least one transverse segment and the at least one bevel, exerts a compensating motion upon the outer synchronization ring in a radial direction, if the at least one pressure piece has previously executed a swivel motion in a direction of the recess of the synchronizer hub, whereupon the at least one pressure piece engages in respective recesses of the outer synchronization ring, in a case of a blocking operation during an equalization of a rotational speed between a clutch body and the outer synchronizer ring, and which remain in the respective recesses of the outer synchronization ring in an unblocked state following a completion of the equalization of the rotational speed.

10. The synchronization unit of claim 9, wherein the pressure piece has a side with a surface matching a contact surface of the recess of the outer synchronizer ring such that a frictional action between the pressure piece and the outer synchronizer ring reduces an unblocking force at the contact surface.

11. The synchronization unit of claim 10, wherein the surface matching the contact surface of the recess of the outer synchronizer ring is a bevel defined by an angle.

12. The synchronization unit of claim 9, wherein the pressure piece is mounted on its base side in such a way that it can execute a radial unblocking motion in the unblocking phase.

13. The synchronization unit of claim 9, wherein the pressure piece comprises in a region of an axial or radial extremity one of a lug, a wedge, a cylinder and a mounted roller for the purpose of an engagement in the outer synchronizer ring.

14. A synchronization unit for use with a transmission, the synchronization unit comprising:
  a drive shaft coupled with a synchronizer hub comprising a recess of the synchronizer hub;
  a sleeve;
  at least one speed-change gear;
  an outer synchronization ring comprising at least one recess of the outer synchronization ring and mounted so as to be movable; and
  at least one pressure piece, which, as seen from outside of the synchronizer hub in a radial direction, is formed, like an I-shaped finger, with a middle, longitudinal region directed in an axial output direction of the drive shaft, the middle, longitudinal region extends over a width of the synchronizer hub, wherein the at least one pressure piece is mounted on a separate detent mounting with three degrees of freedom, the separate detent mounting being coupled to the at least one pressure piece through an elastic element so as to render possible a raising motion by the at least one pressure piece, a base of the separate detent mounting being formed in a longitudinally displaceable mounting, the at least one pressure piece is disposed so as to be capable of a tilting motion in the synchronizer hub, the at least one pressure piece having at least one transverse segment, the at least one pressure piece having at least one bevel, the at least one pressure piece acting as a full-servo synchronization pressure piece being movable in such a way that it engages in the at least one recess of the outer synchronization ring, and, by way of the at least one transverse segment and the at least one bevel, exerts a compensating motion upon the outer synchronization ring in a radial direction, if the at least one pressure piece has previously executed a swivel motion in a direction of the recess of the synchronizer hub.

15. In a transmission having an idler gear, a shift sleeve and a synchronizer hub, disposed on a transmission shaft, an improvement comprising a synchronization pressure piece for synchronization of the idler gear, the synchronization pressure piece, as seen from outside of the synchronizer hub in a radial direction, being formed as an I-shaped finger, said synchronization pressure piece having a middle, longitudinal region, which extends in an axial, output direction of said transmission shaft and further extends over a width of the synchronizer hub, the synchronization pressure piece being tiltably arranged in said synchronizer hub, wherein said synchronization pressure piece has at least one beveled corner region and at least one transverse segment, which extends virtually at a right angle to the middle, longitudinal region in a transverse direction relative to the width of the synchronizer hub, wherein the at least one transverse segment delimits the middle, longitudinal region of the synchronization pressure piece, the middle, longitudinal region of the synchronization pressure piece being overall longer and narrower than the at least one transverse segment, a ratio between a width of the middle, longitudinal region of the synchronization pressure piece and the at least one transverse segment ranging from 1:1.2 to 1:2.5.

16. The transmission of claim 15 wherein the at least one beveled corner region, is disposed to face outwards from the middle, longitudinal region of the synchronization pressure piece and is disposed on an inner surface of the transverse segment of the I-shaped finger, wherein said beveled corner region is arranged to engage, through a horizontal angular displacement, a recess of the synchronizer hub, which is of a similar angular form.

* * * * *